US011731333B2

(12) United States Patent
Tang et al.

(10) Patent No.: US 11,731,333 B2
(45) Date of Patent: Aug. 22, 2023

(54) WOOD-PLASTIC COATED METAL COMPOSITE PROFILE AND PROCESS FOR PRODUCING THE SAME

(71) Applicant: ANHUI SENTAI WPC GROUP SHARE CO., LTD., Guangde (CN)

(72) Inventors: Daoyuan Tang, Guangde (CN); Guangrong Wu, Guangde (CN); Zhiyong Zhang, Guangde (CN)

(73) Assignee: Anhui Sentai WPC Group Share Co., Ltd., Guangde (CN)

( * ) Notice: Subject to any disclaimer, the term of this patent is extended or adjusted under 35 U.S.C. 154(b) by 190 days.

(21) Appl. No.: 17/328,153

(22) Filed: May 24, 2021

(65) Prior Publication Data
US 2022/0355524 A1 Nov. 10, 2022

(30) Foreign Application Priority Data
May 6, 2021 (CN) .......................... 202110489656.4

(51) Int. Cl.
| | | |
|---|---|---|
| *B29C 48/00* | (2019.01) | |
| *B29C 48/18* | (2019.01) | |
| *B29C 48/15* | (2019.01) | |
| *C08L 97/02* | (2006.01) | |
| *B32B 15/20* | (2006.01) | |
| *B29C 48/154* | (2019.01) | |
| *B32B 3/30* | (2006.01) | |
| *B32B 15/08* | (2006.01) | |
| *B32B 15/085* | (2006.01) | |
| *B32B 15/095* | (2006.01) | |
| *B29K 1/00* | (2006.01) | |
| *B29K 75/00* | (2006.01) | |

(52) U.S. Cl.
CPC ............ *B29C 48/022* (2019.02); *B29C 48/15* (2019.02); *B29C 48/154* (2019.02); *B29C 48/18* (2019.02); *B32B 3/30* (2013.01); *B32B 15/08* (2013.01); *B32B 15/085* (2013.01); *B32B 15/095* (2013.01); *B32B 15/20* (2013.01); *C08L 97/02* (2013.01); *B29K 2001/00* (2013.01); *B29K 2075/00* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 2013/0171420 A1* | 7/2013 | Yokota | ...................... B32B 3/30 428/416 |
| 2017/0028683 A1* | 2/2017 | Ha | ......................... B32B 27/308 |
| 2017/0198837 A1* | 7/2017 | Wako | ...................... F16L 9/147 |

FOREIGN PATENT DOCUMENTS

| | | | | |
|---|---|---|---|---|
| WO | WO-2020031963 A1 * | 2/2020 | ............. B32B 27/40 |

OTHER PUBLICATIONS

Shokoohi—silane coupling agents in polymer composites—J. Reinforc.Plast.Comp.—2008 (Year: 2008).*
Isokawa—WO 2020-031963 A1—MT—TPU composition w—adhesion to metal—w—carboxyl.acid+isocyanate—2020 (Year: 2020).*

* cited by examiner

*Primary Examiner* — John Vincent Lawler
(74) *Attorney, Agent, or Firm* — Olive Law Group, PLLC

(57) ABSTRACT

The present disclosure relates to a wood-plastic coated metal composite profile and a production process, and belongs to the technical field of composite profiles. The wood-plastic coated metal composite profile includes a metal core material, a wood-plastic surface layer and an intermediate layer provided between the metal core material and the wood-plastic surface layer. The intermediate layer includes unsaturated carboxylic acid modified polyolefin and thermoplastic polyurethane elastomer, inorganic filler, polyurethane prepolymer. In the present disclosure, an intermediate layer is provided between the wood-plastic surface layer and the metal core material for bonding. The intermediate layer has excellent performance when bonding with the metal, and at the same time, it can blend with the wood-plastic surface layer to a certain extent during co-extrusion. Thereby, a stable structure with core material-intermediate layer-wood-plastic surface layer is formed, and the intermediate layer has good elasticity and impact resistance, and can maintain good bonding under various environments.

7 Claims, No Drawings

WOOD-PLASTIC COATED METAL COMPOSITE PROFILE AND PROCESS FOR PRODUCING THE SAME

CROSS REFERENCE TO RELATED APPLICATION

This application claims priority to Chinese Patent Application No. 2021104896564, filed May 6, 2021, the content of which is incorporated herein by reference in its entirety.

TECHNICAL FIELD

The present disclosure relates to a wood-plastic coated metal composite profile and a process for producing the same, and belongs to the technical field of composite profiles.

BACKGROUND

Metal profile is a common component in the building field. In order to improve the performance of the metal profile, the outer layer of the metal profile usually needs surface treatment, and wood-plastic coating is one of the operations. The wood-plastic coating treatment refers to the use of the metal profile as the core layer, and the wood-plastic layer is extruded outside the core layer to protect the outer surface of the metal and at the same time make the profile have a woody feel. The composition of the wood-plastic layer is usually composed of thermoplastic resin, wood powder, bamboo powder and other biomass materials and some other additives. Among them, the most used thermoplastic resin is polyolefin polymer materials.

However, polyolefin-based materials usually have a weak bonding ability with metals, and the added wood powder further reduces the bonding strength between the wood-plastic coating layer and the metal core layer, making them easy to be separated, especially after changes in the cold and hot environment or after exposure to water, the delamination phenomenon is more significant. In order to solve the above problems, people began to add a glue layer between the wood-plastic coating layer and the metal core layer, and indirectly bond the coating layer and the core layer through the glue layer. For example, the patent document with Publication No.: CN103209832B provides a one-piece extrusion molding and construction components, the patent uses α-olefin and epoxy-containing unsaturated monomers as raw materials to polymerize a copolymer as a raw material for bonding layer to bond the metal core layer and the wood-plastic layer, to solve the problem of poor bonding between the wood-plastic layer and the metal core layer. However, the bonding layer described in the patent mainly improves the bonding force between the bonding layer and the wood-plastic layer through the interaction between the epoxy group in the bonding layer material and the wood powder in the wood-plastic layer, and it does not solve the problem of bonding between the bonding layer and the metal. In practice, the bonding layer easily falls off the surface of the metal core layer together with the wood-plastic layer, affecting the service life.

SUMMARY

The present disclosure provides a wood-plastic coated metal composite profile. An intermediate layer is formed between the wood-plastic surface layer and the metal core material. The intermediate layer has good bonding performance to the wood-plastic material and the metal core material on the surface layer, so that the wood-plastic surface layer, especially polyolefin wood-plastic, has a better coating effect on the metal core material.

Specifically, the technical solutions adopted by the present disclosure are as follows:

A wood-plastic coated metal composite profile includes a metal core material, a wood-plastic surface layer, and an intermediate layer provided between the metal core material and the wood-plastic surface layer, the intermediate layer includes an unsaturated carboxylic acid modified polyolefin resin as a matrix resin, a thermoplastic polyurethane elastomer, an inorganic filler as an additive material and a polyurethane prepolymer.

The above technical scheme of the present disclosure adopts a co-extrusion process, a metal core material is used as a base material, and the outer layer of the metal core material is coated with a composite polymer layer mainly composed of unsaturated carboxylic acid modified polyolefin resin and thermoplastic polyurethane elastomer as the main components. The composite polymer layer is self-adhesive, and finally the wood-plastic surface layer is extruded and coated on the intermediate layer, and the finished product can be obtained after cooling and shaping. The co-extrusion process of the present disclosure is realized by a special mold. The mold has a metal core channel axially penetrating the mold itself, and also has an intermediate layer runner extending laterally to the metal core channel and a wood-plastic surface layer runner. The metal core material gradually passes through the metal core channel under the traction. In the process of passing through the channel, the material of the intermediate layer is melted and extruded by an extruder to the intermediate layer runner and coated around the metal core material, and then the material of the wood-plastic surface layer is melted and extruded through another extruder to the wood-plastic surface layer runner and coated around the intermediate layer. Finally, a three-layer structure including the core material is formed and then extruded from the mold.

The above metal core material can be made of aluminum, iron, copper or a variety of metal alloys, such as aluminum alloy, stainless steel, galvanized steel, etc. From the perspective of practical application and processing, metal profiles need to be considered in the application process of the construction field the difficulty of construction and the influence of the self-weight of the profile on the force of the structure, lighter materials are usually required. The reason why the profile has multiple functions is because its cross-section has a variety of shapes and can be connected to a variety of structures. Therefore, high precision is required in the processing, and materials with strong plasticity are needed. Based on the above points, aluminum alloy is preferred as a metal core material. In the present disclosure, the metal core material is not limited to a structure with a regular geometric shape such as a rectangular cross-section, and its cross-section can be a special shape such as a hollow shape, a U-shape, and an L-shape etc. The specific shape is designed according to its specific application. When co-extruding and coating the metal core material of special shape, the metal core material channel of the mold also needs to be modified correspondingly to adapt to the shape of the metal core material.

Before the metal core material is coated, it may preferably be surface treated, and the surface treatment includes chemical treatment and physical treatment.

Chemical treatment refers to the formation of a layer of oxide film on the surface of aluminum alloy. The specific formation method is usually anodization, that is, the aluminum alloy core material is connected to the anode of the power source, and the cathode of the power source is connected to a conductor, the aluminum alloy core material and the conductor are placed in the electrolyte solution and energized. At this time, the aluminum on the surface of the aluminum alloy loses electrons and is oxidized to form aluminum oxide. Some oxidizing substances in the cathode area accept electrons and are reduced. These oxidizing substances takes hydrogen ions as an example, the hydrogen ions are reduced after accepting electrons to produce hydrogen gas. In order to achieve the above process, more hydrogen ions need to be present in the electrolyte, so the electrolyte can be a phosphoric acid solution, a sulfuric acid solution, an oxalic acid solution, and the like. Since the conductor connected to the cathode does not participate in the reaction, a variety of materials can be selected. In order to facilitate the reduction of hydrogen ions, it is preferable to use an electrode material with a larger surface area, such as a graphite electrode etc. After surface oxidation, a relatively dense aluminum oxide film can be obtained on the surface of the aluminum alloy. At this time, from a microscopic point of view, the surface of the aluminum oxide film is actually an uneven structure with holes. In the conventional process, after the aluminum oxide film is formed, the surface of the aluminum alloy needs to be sealed (usually treated with a sealing agent) to prevent the surface from corroding based on the hole. While in the present disclosure, the surface of the aluminum alloy will be isolated and protected by the coating layer, sealing treatment is not required. On the contrary, the pore structure on the surface can increase the contact area between the intermediate layer and the aluminum alloy core material and form a microscopic structure, thereby increasing the bonding between the intermediate layer and the aluminum alloy core materials. However, for an aluminum alloy core material that is not completely coated, such as an aluminum alloy core material with a hollow structure, it has an outer surface in contact with the coating layer and an inner surface forming the outline of the hollow structure. Since the inner surface is exposed to the outside, theoretically, the inner surface should be locally sealed. However, in the core material application process, the inner surface is divided into two situations. One is that the hollow structure is communicated with the outside, at this time, the inner surface may come into contact with corrosive substances. The other is that the hollow structure is formed into a closed structure after the core material is installed, at this time the inner surface will not be in contact with external corrosives. For the former, the inner surface should preferably be sealed. If the local sealing technology is difficult in actual production, the core material can be fully sealed. Since the bonding force of the intermediate layer modification of the present disclosure to the metal is sufficient to meet the use standard, the bonding force to the metal after sealing will not have a large impact, and the sealing treatment may not be performed for the latter.

Physical treatment refers to processing and forming a plurality of grooves along the length direction on the outer surface of the aluminum alloy core material covered by the wood-plastic layer. The function of the groove is to form an interlocking structure with the intermediate layer on the macrostructure and to improve the contact area between the intermediate layer and the aluminum alloy core material, thereby improving the bonding strength. The "along the length direction" here is not limited to a straight line, and it may be curved grooves as long as their approximate directions are along the length direction of the aluminum alloy core material, and a plurality of regular linear grooves are preferably formed. There are two reasons why the groove is designed along the length direction. The first reason is that although the complex shape of the groove can improve the bonding force between the intermediate layer and the metal core material, the improvement of this bonding force is limited and not obvious. More importantly, the groove formed along the length direction, compared with the grooves formed in other directions, has the significantly lower processing difficulty, and the total number of grooves required to be formed is also less, and the processing parts required are simpler. The other reason is that the aluminum alloy core material in this design moves along the groove to enter the mold and is covered. When being covered, the air in the groove can be discharged along the groove in the direction opposite to the movement of the aluminum alloy core material without pores present in the groove. If the groove is provided in other directions (such as in the width direction), the air cannot be discharged and will remain between the intermediate layer and the aluminum alloy core material to form cavitation. The cross-section of the groove may be better to be designed in a shape with a decreasing groove width from the slot to the bottom of the groove, such as an inverted triangle, an arc shape, etc., so that the intermediate layer material can enter the groove. Preferably, the aluminum alloy core material is first subjected to physical treatment to form the grooves, and then chemical treatment is performed to form an oxide film, so as to avoid damage to the oxide film during groove processing. The formation of the grooves can be directly formed by the aluminum alloy core material through the action of the mold during extrusion molding, or can be formed by secondary processing of the aluminum alloy core material.

For the wood-plastic surface layer, the composition matrix is thermoplastic resin and natural plant fiber powder. In particular, the thermoplastic resin is a polymer material obtained by polymerizing olefin monomers, such as ethylene, propylene, butene, etc. The specific polymerization method may be polymerizing a single monomer, such as polyethylene and polypropylene, or multiple monomers can be copolymerized, such as polyethylene propylene polymerized using ethylene and propylene as raw materials. It should be noted that the olefin polymer described in the present disclosure describes that the main chain structure of the polymer is obtained by the addition reaction of carbon-carbon double bonds, and it is not limited to monomers having only carbon-carbon double bond functional groups. In addition to the carbon-carbon double bond, other functional groups such as acrylic acid, ethyl crotonate and the like can also exist in the monomer.

In addition to thermoplastic resin and natural plant fiber powder, the wood-plastic surface layer may also include some other functional additives commonly used in products, such as reinforcing agents, coloring agents, antioxidants, anti-ultraviolet agents, inorganic fillers, etc., to enhance the physical and chemical properties of wood-plastic, such as oxidation resistance, UV stability, etc.

Furthermore, the wood-plastic surface layer may also contain unsaturated carboxylic acid modified polyolefin. The unsaturated carboxylic acid here refers to a carboxylic acid or acid anhydride or carboxylic acid derivative with one or more unsaturated bonds. Preferably, the unsaturated bonds are carbon-carbon double bonds at the end of the molecule, for example unsaturated monobasic acids such as acrylic acid, methacrylic acid, and crotonic acid, and dibasic acids such as maleic acid, maleic anhydride, and phthalic acid, as well as the above derivatives of the unsaturated carboxylic acids, such as ester compounds formed by condensation of carboxylic acid and alcohol, acyl compounds formed after the hydroxyl group of carboxylic acid is substituted, and the like. The side chain of carboxylic acid and its derivative modified resin has oxygen-containing groups such as carbonyl group and hydroxyl group, and the cellulose in wood powder also has a large number of hydroxyl groups, so weak bonds such as hydrogen bonds can be generated between them, and at the same time, the carboxyl group of the unsaturated carboxylic acid modified resin can condense to a certain extent with the hydroxyl group in the cellulose, resulting in a strong bond. Therefore, the unsaturated carboxylic acid and its derivatives modified polyolefin and wood powder have good compatibility, and at the same time, because it has good compatibility with polyolefin resin, wood powder can be uniformly dispersed in wood-plastic material along with the flow of unsaturated carboxylic acid modified resin in polyolefin resin.

The modified form of the unsaturated carboxylic acid modified resin can be in various forms such as blending, copolymerization, grafting, etc. Blending refers to the polymerization of single or multiple unsaturated carboxylic acids to obtain polymers with unsaturated carboxylic acids as monomers, such as polyacrylic acid, polycrotonic acid, copolymers of polyacrylic acid and polycrotonic acid, etc., and the polymers being added to the original wood-plastic surface material, melt blending to obtain modified wood-plastic surface layer material. In this modification method, the unsaturated carboxylic acid does not directly react with the polyolefin resin in the wood-plastic surface layer, only physical mixing (without considering the cross-linking between polymer chains). Copolymerization refers to the addition of unsaturated carboxylic acid during the synthesis of polyolefin resin to obtain copolymers of olefin monomers and unsaturated carboxylic acid monomers, such as ethylene-ethylene-polypropylene-ethylene-ethylene and other chain structures. Grafting refers to the grafting reaction of the polymer chain after the synthesis of the polyolefin resin is completed, and the side chain structure is added to the polymer chain, so that the polymer obtains additional groups, such as maleic anhydride grafted polyethylene.

For the wood-plastic surface, it is not limited to only a single wood-plastic layered structure. Other layered structures can also be compounded on the outer surface of the wood-plastic. Due to various requirements in the actual use process, the wood-plastic surface sometimes has other layered composites, such as laminating a printing layer on the outer surface of the wood-plastic surface layer, coating a wear-resistant layer, etc. The present disclosure aims to modify the bonding strength of the inner surface of the wood-plastic surface layer, so other processing behaviors on the outer side surface are not within the scope of the present disclosure, and the present disclosure does not limit it either.

The intermediate layer is a composite polymer layer composed of unsaturated carboxylic acid-modified polyolefin resin, thermoplastic polyurethane elastomer, inorganic filler, polyurethane prepolymer, and a blend system of carboxylic acid-modified polyolefin resin and thermoplastic polyurethane elastomer constitutes the matrix component of the intermediate layer, giving the intermediate layer lower than elastomer but higher elasticity and toughness than ordinary thermoplastic polyolefin resin, and at the same time endows the necessary rigidity to the intermediate layer as a bonding transition layer, so as to avoid the damage of the intermediate layer caused by force transmission when the outer layer is subjected to unexpected violence. The inorganic filler of the intermediate layer is used to adjust the hardness of the intermediate layer, and the polyurethane prepolymer makes the intermediate layer have good self-bonding relative to the metal substrate, without the need to use additional adhesives.

Although the composition of the intermediate layer has been disclosed above. But in practice, bonding across materials is not easy, especially metals and thermoplastic polyolefins.

Based on the inventors' research, the bonding of organic polymer materials to metals usually comes from two mechanisms. One is the physical adsorption formed between organic molecules or certain groups of organic molecules and the metal surface; the other is chemical bonds such as coordination bonds between certain groups of organic molecules and metal atoms on the metal surface to enhance the adsorption strength. The adsorption strength of the latter is much higher than that of the former. Metal, as a typical electron-deficient substance, usually forms a chemical bond with a multi-electron organic substance that can provide electron pairs to produce a strong bonding effect. While, the structure of polyolefins, especially polyethylene, is a low-polarity polymer without branches, because of the lack of electron-donating groups, it cannot form coordination with metals, so the bond strength between them is very low. For the same reason, other polymers with similar structures, such as polypropylene, ethylene-propylene rubber, etc., are also difficult to bond to metal, and the above phenomenon does occur in the actual production process.

The bonding of the intermediate layer material to the wood-plastic surface layer will have certain differences depending on the preparation process. The present disclosure adopts a co-extrusion process. The intermediate layer is first extruded and covered to the metal core material, and then the wood-plastic surface layer is extruded and covered to the intermediate layer. When the wood-plastic surface layer covers the intermediate layer, the intermediate layer has not completely cooled and hardened, so the wood-plastic surface layer and the intermediate layer will melt on the contact surface to form an integrated structure, and the degree of integration of the structure depends on the compatibility betweenthere.

The composite polymer constituting the intermediate layer of the present disclosure is mainly a blend system of unsaturated carboxylic acid-modified polyolefin and thermoplastic polyurethane. In this system, the side chain of the polymer chain has groups such as carboxyl group and ester group. On one hand, the polarity of the polymer chain is enhanced, and the physical adsorption between the polymer and the metal surface is improved. On the other hand, these multi-electron groups can cooperate with the metal ions on the metal surface to further improve the bonding to the metal. Therefore, the composite polymer layer can produce good bonding to the metal surface.

The interface between the composite polymer layer and the wood-plastic layer is a resin system based on polyolefin, so the intermediate layer and the wood-plastic layer and the surface layer have good compatibility, and the polyolefin modification of the intermediate layer is modified by unsaturated carboxylic acid. In the wood-plastic surface layer, the unsaturated carboxylic acid modification of polyolefin can be even the most effective way to improve the compatibility of plant fiber powder and polyolefin. Therefore, the unsaturated carboxylic acid-modified resin in the intermediate layer not only has good compatibility with the polyolefin component of the wood-plastic surface layer, but also has good compatibility with the wood powder component of the wood-plastic surface layer. From another point, when the intermediate layer is bonded to the wood-plastic surface layer, the contact surface of the wood-plastic surface layer from a microscopic analysis mainly has the following relatively independent phases: polyolefin resin phase, unsaturated carboxylic acid modified polyolefin phase, wood powder phase. The thermoplastic polyolefin elastomer of the intermediate layer has insufficient compatibility with the above phases. When the thermoplastic polyolefin elastomer also contains unsaturated carboxylic acid-modified polyolefin, it can improve the overall degree of blending through the local melting. When the thermoplastic polyolefin elastomer also contains unsaturated carboxylic acid modified polyolefin, the overall degree of blending can be improved by local blending. The unsaturated carboxylic acid-modified polyolefin in the intermediate layer has a non-polar main chain part and a polar side chain part. The main chain part can produce better blending with the polyolefin in the wood-plastic surface layer, and the side chain part can blend with the unsaturated carboxylic acid modified polyolefin and wood powder in the wood plastic surface layer. In other words, during the formation of the product, the wood-plastic surface layer and the intermediate layer will blend on the contact surface to form a good integrated structure.

As a preference of the above technical solution, the composite polymer layer further includes isocyanate.

One aspect of the present disclosure is to study and improve the bonding between the wood-plastic surface layer and the metal substrate. When an appropriate amount of isocyanate is added to the composite polymer system of the intermediate layer, the ester group content of the system can be significantly increased, which has a significant effect on improving the bonding to the metal. In other words, the self-bonding of the intermediate layer based on the metal core material can be significantly improved.

As a preference of the above technical solution, the thickness of the intermediate layer is 0.5 to 5.0 mm.

One aspect of the present disclosure is intended to studying the self-protection ability of wood-plastic coated profiles under instantaneous limit load failure. Therefore, the inventor is not satisfied with the good bonding between the composite intermediate layer and the metal core material. Because the traditional adhesive layer can only provide adhesiveness, and the stability of the adhesiveness is conditional. When the wood-plastic surface layer or the composite polymer layer is oxidized or aged, the adhesiveness will be problematic; but the solution to this problem is relatively simple. Usually, an appropriate amount of functional additives, such as ultraviolet absorption agents, antioxidants, etc., are added to the wood-plastic surface layer. Other aspects of the stability of the adhesive, such as mechanical stress subject to accidental impact, whether the adhesive layer can still provide its due function is closely watched by engineers.

In solving the above problems, the present disclosure provides another protection scheme. The solution is that the intermediate layer includes a first intermediate layer adhered to a metal core material and a second intermediate layer adhered to a wood-plastic surface layer; the composition of the first intermediate layer includes the following components by mass: unsaturated carboxylic acid modified polyolefin resin 40~60, thermoplastic polyurethane elastomer 20~30, polyurethane prepolymer 5~15, isocyanate 1~5, inorganic filler 5~10; the composition of the second intermediate layer includes: polyolefin resin 30~50, unsaturated carboxylic acid modified polyolefin resin 10~20, polyvinyl butyral resin 20~30, inorganic filler 5~10.

In the above solution, the first intermediate layer provides bonding to the metal core material. The second intermediate layer is integrated with the first intermediate layer and is compounded on the surface of the first intermediate layer, to provide impact protection. The second intermediate layer is formed by a blend system of polyolefin resin and polyvinyl butyral resin, in which unsaturated carboxylic acid modified polyolefin resin is used as a solubilizer to improve the compatibility between polyolefin resin and polyvinyl butyral resin, making polyolefin resin and polyvinyl butyral resin locally compatible. In this system, correspondingly, the polyolefin resin phase provides rigidity and hardness, and the polyvinyl butyral resin phase provides a certain degree of flexibility. Based on this, before the mechanical force is applied to the first intermediate layer, it is first balanced by the second intermediate layer. Since the second intermediate layer has good flexibility, it can balance a larger part of the mechanical force. From the point of structural composition, the rigidity and flexibility of the second intermediate layer are between the wood-plastic surface layer and the first intermediate layer. In this way, it can play a good buffering effect under the action of mechanical external force.

In addition, compared with the first intermediate layer, the second intermediate layer has removed the polyurethane elastomer. Since the wood-plastic surface layer does not contain polyurethane elastomer components, removing it can also improve the degree of blending between the second intermediate layer and the wood-plastic surface layer. On the whole, the double-layer structure has better impact protection than the single-layer structure, and it also has a stronger interlayer bonding effect. Since the stability of the wood-plastic layer coated on the metal core material depends more on the bonding between the intermediate layer and the metal, the thickness of the first intermediate layer should be greater than or equal to the second intermediate layer to make the first intermediate layer better play a role. Preferably, the sum of the thickness of the first intermediate layer and the second intermediate layer may be 0.5 to 5.0 mm.

In the preparation process of the present disclosure, the materials of the wood-plastic surface layer, the first intermediate layer, and the second intermediate layer may be pre-treated and granulated respectively before use, so as to prevent uneven dispersion of the components from affecting the quality.

As a preference of the above technical solution, the wood-plastic surface layer contains unsaturated carboxylic acid modified polyolefin.

As a preference of the above technical solution, the inorganic filler is a surface activated inorganic filler after pretreatment with a silane coupling agent.

As a preference of the above technical solution, the metal core material is an aluminum core material with an oxide film on the surface.

As a preference of the above technical solution, at least one outer surface of the metal core material and the intermediate layer is bonded to form grooves with a depth of 0.03 to 1.0 mm along the length direction of the metal core layer.

It should be noted that although the present disclosure is analyzed and described based on the more common metal core material with the outer surface full coated in actual use, part of the outer surface coating of the metal core material may also be included within the scope of the present disclosure. For example, two long sides of a metal core material with a rectangular cross-section are covered so that the two short sides are exposed to the outside.

Another object of the present disclosure is to provide a process for producing the above wood-plastic coated metal composite profile.

The process for producing the wood-plastic coated metal composite profiles includes the following steps:

a, leading a pre-treated metal core material into a mold by traction;

b, extruding a material of an intermediate layer into the mold in a molten state through an extruder, and coating an intermediate layer melt body on a circumferential surface of the metal core material through an intermediate layer runner of the mold, to form a metal core material coated with the intermediate layer;

c, extruding a material of a wood-plastic surface layer into the mold in a molten state through another extruder, and coating a wood-plastic melt body on an outer surface of the intermediate layer through a surface runner of the mold;

d, cooling and shaping the coated metal composite profile to obtain a finished product.

As a preference of the above technical solution, the intermediate layer described in step b includes a first intermediate layer and a second intermediate layer. The material of the first intermediate layer is coated on the outer surface of the metal core material through the first extruder, and the material of the second intermediate layer is coated to the outer surface of the first intermediate layer through the second extruder. The composition of the first intermediate layer includes the following components by mass: unsaturated carboxylic acid modified polyolefin resin 40~60, thermoplastic polyurethane elastomer 20~30, polyurethane prepolymer 5~15, isocyanate 1~5, inorganic filler 5~10; the composition of the second intermediate layer is: polyolefin resin 30~50, unsaturated carboxylic acid modified polyolefin resin 10~20, polyvinyl butyral resin 20~30, inorganic Packing 5~10.

In summary, the present disclosure has the following beneficial effects:

The present disclosure uses wood-plastic surface layer represented by polyolefin wood-plastic to coat the metal core material to prepare the metal composite profiles. Because the polyolefin and wood powder components in polyolefin wood-plastic have poor bonding performance to the metal core material, the present disclosure sets up an intermediate layer between then for bonding. The intermediate layer has excellent performance when it is bonded to the metal. At the same time, it can blend with the wood-plastic surface layer to a certain extent during co-extrusion, thereby forming a stable structure with core material-intermediate layer-wood-plastic surface layer. The intermediate layer has good elasticity and impact resistance, and can maintain good bonding in various environments. Further, the present disclosure divides the intermediate layer into a first intermediate layer and a second intermediate layer. The first intermediate layer removes the polyolefin with poor bonding to the metal, and the second intermediate layer removes the polyurethane elastomer with poor bonding to the wood-plastic surface layer, such that the bonding strengths of the intermediate layer to the metal core material and the wood-plastic surface layer at the same time can be improved, and the bonding effect can be further enhanced.

DESCRIPTION OF EMBODIMENTS

The following examples and comparative examples are used to further illustrate the implementation and performance of the present disclosure.

In order to facilitate the comparison of the performance of each example and the comparative example, the metal core material in each comparative example and the example uniformly selects a cubic structure aluminum alloy core material with 200 mm*200 mm*3000 mm, and the inside of the aluminum alloy core material has a square cross-section. The thickness of the aluminum alloy sandwiched between the outer surface and the inner surface of the core material is 3 mm. Before coating the metal core material, the pretreatment is carried out. The pretreatment process may include:

a, knurling treatment: a knurling process is used to form multiple V-shaped grooves with a depth of 0.3 mm on the outer surface of the core material along the length of the core material;

b, surface oxidation treatment: the core material with grooves in a is anodized to obtain a layer of aluminum oxide film (without sealing treatment).

In addition, before the core material is drawn into the mold, the core material needs to be pre-heated to about 100° C.

The preparation method of wood-plastic coated profiles is as follows:

leading the pre-treated aluminum alloy core material into the main channel of the co-extrusion mold; during the process of passing through the channel, melting and extruding the intermediate layer material to the intermediate layer runner through an extruder and coating around the metal core material; then, melting and extruding the material of the surface layer through another extruder to the surface layer runner and coating around the intermediate layer; finally, forming and extruding a three-layer structure including the core material from the mold. In the following examples, the intermediate layer material may be a self-adhesive composite polymer layer.

Example 1

Materials of the wood-plastic surface layer are: 45 parts of polyethylene, 60 parts of plant fiber powder, 6.25 parts of talc, 0.07 parts of carbon black, 0.38 parts of iron red, 0.6 parts of antioxidants, 1.2 parts of anti-ultraviolet absorbers, and 1.5 parts of lubricants as raw materials. The above materials may be mixed through a mixer, and granulated by an extruder to obtain the material particles of the wood-plastic surface layer.

Materials of the intermediate layer are: 15 parts of polyethylene, 25 parts of maleic anhydride grafted polyethylene, 20 parts of thermoplastic polyurethane elastomer, 10 parts of calcium carbonate, and 10 parts of polyurethane prepolymer as raw materials. First, calcium carbonate may be pre-treated using vinyl triperoxide tert-butyl silane solution, and then polyethylene, maleic anhydride grafted polyethylene, thermoplastic polyurethane elastomer, polyurethane prepolymer and treated calcium carbonate may be mixed through the mixer and granulated through the extruder to obtain the material particles of the intermediate layer.

Example 2

Materials of the wood-plastic surface layer are: 45 parts of polyethylene, 60 parts of plant fiber powder, 6.25 parts of talc, 0.07 parts of carbon black, 0.38 parts of iron red, 0.6 parts of antioxidants, 1.2 parts of anti-ultraviolet absorbers, and 1.5 parts of lubricants as raw materials. The above materials may be mixed through a mixer, and granulated by an extruder to obtain the material particles of the wood-plastic surface layer.

Materials of the intermediate layer are: 40 parts of maleic anhydride grafted polyethylene, 20 parts of thermoplastic polyurethane elastomer, 10 parts of calcium carbonate, and 10 parts of polyurethane prepolymer as raw materials. First, calcium carbonate may be pre-treated using vinyl triperoxide tert-butyl silane solution, and then maleic anhydride grafted polyethylene, thermoplastic polyurethane elastomer, polyurethane prepolymer and treated calcium carbonate may be mixed through the mixer, and granulated through the extruder to obtain the material particles of the intermediate layer.

Example 3

Materials of the wood-plastic surface layer are: 45 parts of polyethylene, 60 parts of plant fiber powder, 6.25 parts of talc, 0.07 parts of carbon black, 0.38 parts of iron red, 0.6 parts of antioxidants, 1.2 parts of anti-ultraviolet absorbers, and 1.5 parts of lubricants as raw materials. The above materials may be mixed through a mixer, and granulated by an extruder to obtain the material particles of the wood-plastic surface layer.

Materials of the intermediate layer are: 40 parts of maleic anhydride grafted polyethylene, 20 parts of thermoplastic polyurethane elastomer, 10 parts of calcium carbonate, 10 parts of polyurethane prepolymer, and 5 parts of isocyanate as raw materials. First, calcium carbonate may be pre-treated using vinyl triperoxide tert-butyl silane solution, and then the maleic anhydride grafted polyethylene, polyurethane elastomer, polyurethane prepolymer and the treated calcium carbonate may be mixed by the mixer, and granulated by an extruder to obtain the material particles of the intermediate layer.

Example 4

Materials of the wood-plastic surface layer are: 45 parts of polyethylene, 60 parts of plant fiber powder, 6.25 parts of talc, 0.07 parts of carbon black, 0.38 parts of iron red, 0.6 parts of antioxidants, 1.2 parts of anti-ultraviolet absorbers, and 1.5 parts of lubricants as raw materials. The above materials may be mixed through a mixer, and granulated by an extruder to obtain the material particles of the wood-plastic surface layer.

Materials of the first intermediate layer are: 40 parts of maleic anhydride grafted polyethylene, 20 parts of thermoplastic polyurethane elastomer, 10 parts of calcium carbonate, and 10 parts of polyurethane prepolymer as raw materials. First, calcium carbonate may be pre-treated using vinyl triperoxide tert-butyl silane solution, and then the maleic anhydride grafted polyethylene, polyurethane elastomer, polyurethane prepolymer and the treated calcium carbonate may be mixed by the mixer, and granulated by an extruder to obtain the material particles of the intermediate layer.

Materials of the second intermediate layer are: 35 parts of polyethylene, 15 parts of maleic anhydride grafted polyethylene, 25 parts of polyvinyl butyral resin, 10 parts of calcium carbonate. First, calcium carbonate may be pre-treated using vinyl triperoxide tert-butyl silane solution, and then polyethylene, maleic anhydride grafted polyethylene, polyvinyl butyral resin, and treated calcium carbonate may be mixed through the mixer, and granulated through the extruder to obtain the material particles of the second intermediate layer.

Example 5

Materials of the wood-plastic surface layer are: 45 parts of polyethylene, 60 parts of plant fiber powder, 6.25 parts of talc, 0.07 parts of carbon black, 0.38 parts of iron red, 0.6 parts of antioxidants, 1.2 parts of anti-ultraviolet absorbers, and 1.5 parts of lubricants as raw materials. The above materials may be mixed through a mixer, and granulated by an extruder to obtain the material particles of the wood-plastic surface layer.

Materials of the first intermediate layer are: 40 parts of maleic anhydride grafted polyethylene, 20 parts of thermoplastic polyurethane elastomer, 10 parts of calcium carbonate, 10 parts of polyurethane prepolymer, and 5 parts of isocyanate as raw materials. First, calcium carbonate may be pre-treated using vinyl triperoxide tert-butyl silane solution, and then maleic anhydride grafted polyethylene, polyurethane elastomer, polyurethane prepolymer, isocyanate and treated calcium carbonate may be mixed through the mixer and granulated through the extruder to obtain the material particles of first intermediate layer.

Materials of the second intermediate layer are: 35 parts of polyethylene, 15 parts of maleic anhydride grafted polyethylene, 25 parts of polyvinyl butyral resin, 10 parts of calcium carbonate. First, calcium carbonate may be pre-treated using vinyl triperoxide tert-butyl silane solution, and then polyethylene, maleic anhydride grafted polyethylene, polyvinyl butyral resin, and treated calcium carbonate may be mixed through the mixer, and granulated through an extruder to obtain the material particles of the second intermediate layer.

Comparative Example 1

The material of the intermediate layer: polyurethane hot melt adhesive;
The material of the wood-plastic surface layer: same as in Example 1.

Comparative Example 2

The material of the intermediate layer: maleic anhydride grafted polyethylene hot melt adhesive;
The material of the wood-plastic surface layer: same as in Example 1.

Examples 1 to 5 and Comparative Examples 1 and 2 were prepared by the following methods to obtain wood-plastic coated metal composite profiles:

Evaluation methods for the products prepared by using the raw materials of Examples 1 to 5 and Comparative Examples 1 and 2:

(1) Test of Internal Bonding Strength Performance

The internal bonding strength is the measurement of the tensile strength when the surface of the test piece bears evenly distributed tension until it fails. The internal bonding strength is the ratio of the maximum breaking tensile force perpendicular to the surface of the test piece and the area of the test piece. It is measured with reference to GB/T 17657-2013.

After storing the sample at 70° C. and 95% relative humidity for 30 days, HY-914 fast adhesive is adopted to stick a steel chuck with a size of 20 mm*20 mm on the product and cut off the adhesive layer following the steel chuck. After the bonding is firm, a tension gauge is adopted to pull up the steel chuck in a direction perpendicular to the plane of the profile, or the steel chuck is placed down, and hung with the weights. The gravity of the weights is recorded, including the maximum tensile force (N) or maximum gravity (recorded as F) before the hot melt adhesive and the aluminum alloy profile delaminate, then the internal bonding strength is P=F/S, where S is the area of the steel chuck.

The number of test grids that fall off in the above test results is shown in the table below. The data recorded in the table is the bonding strength (MPa). If the wood-plastic surface and the intermediate layer have been peeled, floated, and cracked from the metal core material before the test, the data is recorded as 0, indicating that the product is unqualified.

(2) Bonding Performance Test of Cold-Hot Resistance

Measuring is carried out referring to the Method 5.3.10 of LY/T-2565-2015, and evaluation is carried out referring to the standard result of 6.5.9 of GB/T24508-2009.

The samples are taken and placed in a 60° C. water bath environment for 12 hours, and then the samples are placed in an ultra-low temperature refrigerator with a temperature of −35° C. for 24 hours. This process constitutes a cycle. After five cycles, the samples are placed at 23° C.±2° C. at room temperature for 2 hours, and dried; then the samples are tested according to the method in (1).

Testing requirements: No cracks or bubbling on the surface appearance; dimensional change≤0.5 mm.

The Measuring Results

Sampling is carried out according to 6. of LY/T-2565-2015, any 12 samples are a group, and all the properties of each test piece are required to meet the standard. The physical and mechanical properties of the batch of products are determined to be qualified (Pass), otherwise it is unqualified (Failed).

|  | Test of Internal Bonding Strength Performance | Bonding Performance Test of Cold-Hot Resistance |
| --- | --- | --- |
| Example 1 | 1.93 | Pass |
| Example 2 | 1.98 | Pass |
| Example 3 | 2.21 | Pass |
| Example 4 | 2.25 | Pass |
| Example 5 | 2.39 | Pass |
| Comparative Example 1 | 1.89 | Pass |
| Comparative Example 2 | 1.81 | Failed |

What is claimed is:

1. A wood-plastic coated metal composite profile, comprising a metal core material, a wood-plastic surface layer, and an intermediate layer provided between the metal core material and the wood-plastic surface layer, wherein: the intermediate layer is a composite polymer layer comprising an unsaturated carboxylic acid modified polyolefin resin as a matrix resin, a thermoplastic polyurethane elastomer, an inorganic filler as an additive material and a polyurethane prepolymer;

wherein the composite polymer layer further comprises isocyanate;

wherein the intermediate layer comprises a first intermediate layer attached to the metal core material, and a second intermediate layer attached to the wood-plastic surface layer; the first intermediate layer comprises the following components by mass: unsaturated carboxylic acid modified polyolefin resin with 40~60, thermoplastic polyurethane elastomer 20~30, polyurethane prepolymer 5~15, isocyanate 1~5, inorganic filler 5~10; the second intermediate layer comprises: polyolefin resin 30~50, unsaturated carboxylic acid modified polyolefin resin 10~20, polyvinyl butyral resin 20~30, inorganic filler 5~10.

2. The wood-plastic coated metal composite profile according to claim 1, wherein: the intermediate layer has a thickness of 0.5 to 5.0 mm.

3. The wood-plastic coated metal composite profile according to claim 1, wherein: the wood-plastic surface layer contains unsaturated carboxylic acid modified polyolefin.

4. The wood-plastic coated metal composite profile according to claim 1, wherein: the inorganic filler is a surface activated inorganic filler pretreated with a silane coupling agent.

5. The wood-plastic coated metal composite profile according to claim 1, wherein: the metal core material is an aluminum core material with an oxide film on a surface thereof.

6. The wood-plastic coated metal composite profile according to claim 1, wherein: the metal core material is formed with a plurality of grooves on an outer surface of at least one side attached to the intermediate layer, each of the plurality of grooves has a depth of 0.03~1.0 mm along a length direction of the metal core material.

7. A process for producting a wood-plastic coated metal composite profile of claim 1, comprising the following steps:

a, leading a pretreated metal core material into a mold by traction;

b, extruding a material of an intermediate layer into the mold in a molten state through an extruder, wherein the material of the first intermediate layer is coated to the outer surface of the metal core material through a first extruder, and the material of the second intermediate layer is coated to the outer surface of the first intermediate layer through a second extruder, to form a metal core material coated with the intermediate layer;

c, extruding a material of a wood-plastic surface layer into the mold in a molten state through another extruder, and coating a wood-plastic melt body on an outer surface of the intermediate layer through a surface runner of the mold;

d, cooling and shaping the coated metal composite profile to obtain a finished product.

* * * * *